Dec. 16, 1930.　　　W. J. MILLER　　　1,785,590
AUTOMATIC RESETTING SPEAR
Filed March 1, 1930　　2 Sheets-Sheet 1
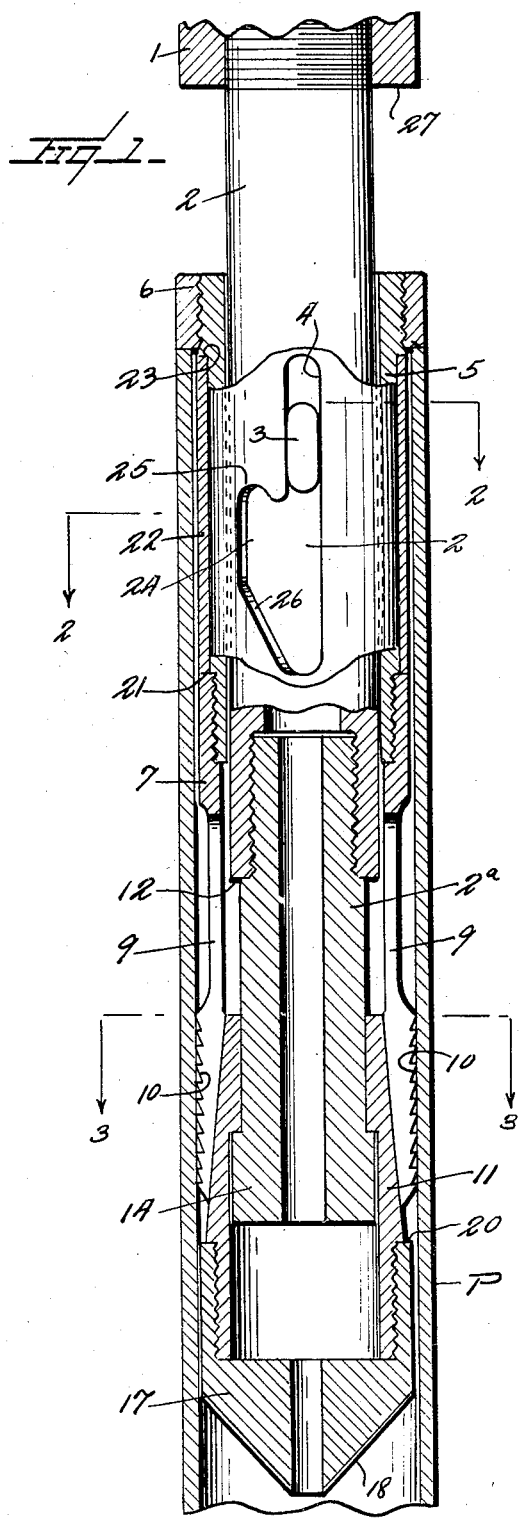
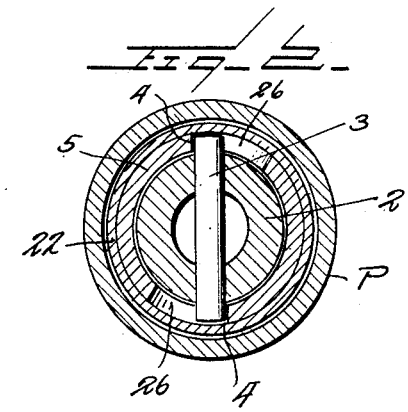
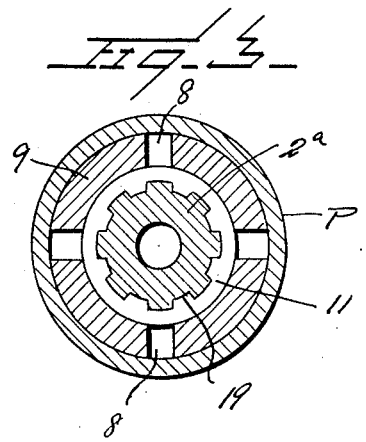
Inventor
W. J. Miller
By Watson E. Coleman
Attorney

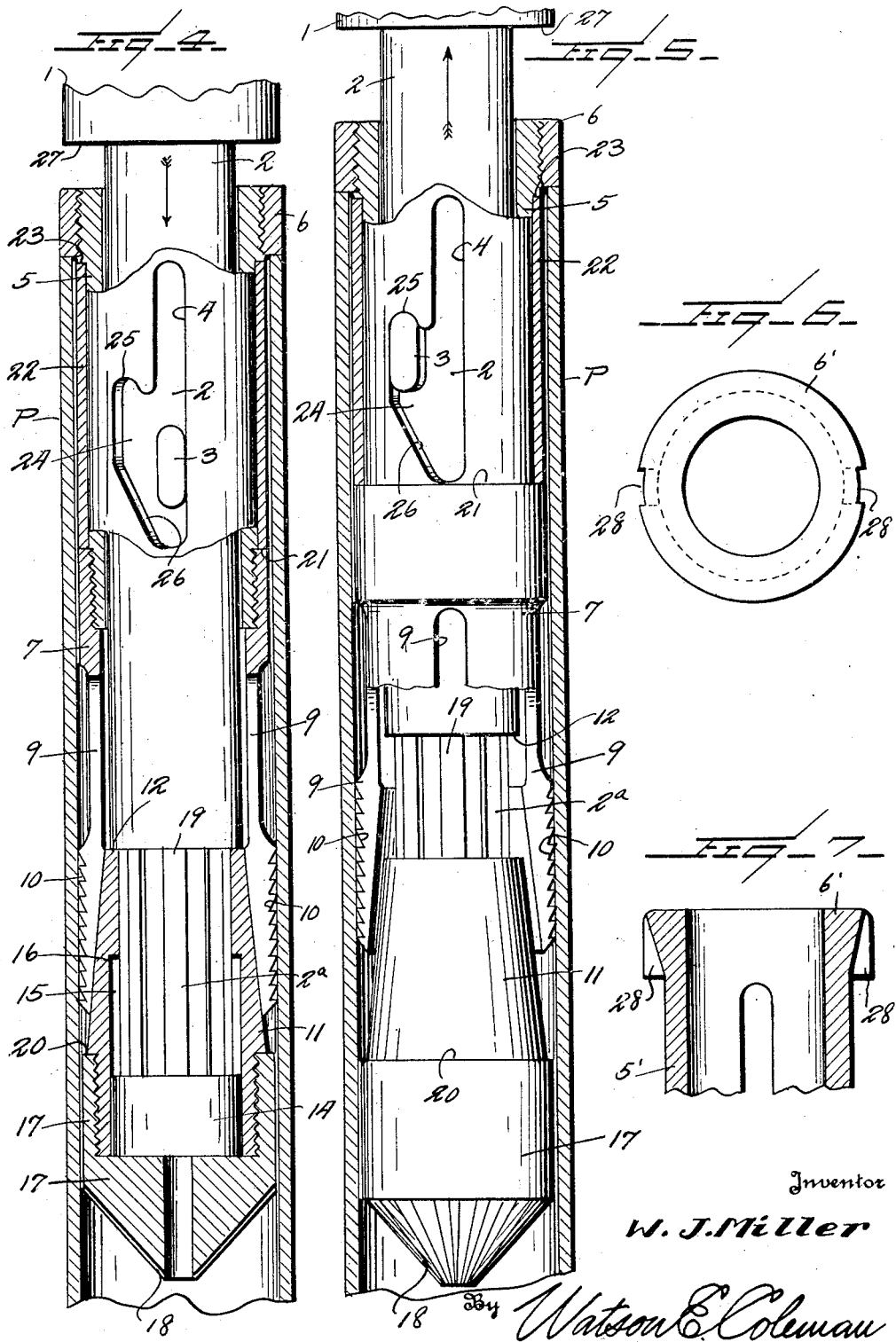
Dec. 16, 1930.  W. J. MILLER  1,785,590
AUTOMATIC RESETTING SPEAR
Filed March 1, 1930  2 Sheets-Sheet 2
Inventor
W. J. Miller
By Watson E. Coleman
Attorney Patented Dec. 16, 1930

1,785,590

UNITED STATES PATENT OFFICE

WILLIAM J. MILLER, OF SULPHUR, LOUISIANA

AUTOMATIC RESETTING SPEAR

Application filed March 1, 1930. Serial No. 432,546.

This invention relates to an automatic resetting spear, and it is an object of the invention to provide a device of this kind wherein the provision is made for an automatic resetting thus keeping the spear always set for pulling.

Another object of the invention is to provide a spear of this kind of a bumper or jar type and which is provided with means to jar the pipe free in order to effect the desired pull.

The invention consists in the details of construction and in the combination and arrangement of the several parts of my improved automatic resetting spear whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view partly in section and partly in elevation illustrating a spear constructed in accordance with an embodiment of my invention with the parts in pulling relation;

Figure 2 is a sectional view taken substantially on the line 2—2 of Figure 1;

Figure 3 is a sectional view taken substantially on the line 3—3 of Figure 1;

Figure 4 is a view partly in section and partly in elevation showing the parts in their relative positions at the time of the first jarring action;

Figure 5 is also a view partly in section and partly in elevation showing the parts in position for release;

Figure 6 is a view in top plan of a collar constructed in accordance with a further embodiment of my invention;

Figure 7 is a fragmentary sectional view taken through the collar as illustrated in Figure 6 and the adjacent portion of the associated sleeve.

As particularly illustrated in Figures 1 to 5 of the accompanying drawings, 1 denotes the lower portion of a drill stem which has threaded therein the upper portion of an elongated tubular shank 2. Disposed radially through this shank 2 at a desired point therealong is a key 3. The extremities of this key 3 extend beyond the shank 2 at opposite sides thereof and each of these extended portions of the key 3 is normally positioned within a pulling slot 4 provided in the wall and extending lengthwise of the release sleeve 5. The upper or outer portion of the sleeve 5 is adapted to have threaded therearound a collar 6 for a purpose to be hereinafter more particularly referred to, the coacting threads being left hand.

The inner or inserted end portion of the sleeve 5 has in threaded connection therewith a slip sleeve 7, the lower portion of which being provided with a series of circumferentially and equidistantly spaced open slots 8 resulting in a plurality of elongated gripping arms 9 carrying the exterior and upwardly disposed gripping teeth 10. The portion of the slip sleeve 7 defined by the outer or free end portions of the arms 9 has its bore tapered for coaction with the tapered mandrel 11 so that relative movement of the slip sleeve 7 and the mandrel 11 one toward the other will result in desired effective expansion of the lower portion of the sleeve 7, or more particularly those portions of the arms 9 carrying the teeth 10.

It is believed to be obvious that the arms 9 possess sufficient inherent resiliency to automatically effect retraction of the arms 9 upon relative movement of the sleeve 7 and mandrel 11 in the opposite direction.

The mandrel 11 has its upper portion snugly and slidably engaged with the lower portion of the inner or inserted shank section 2a which threads within the main shank 2, the inner end of the main shank being, however, of a greater diameter than the diameter of the shank section 2a to provide an annular shoulder 12 surrounding the shank section 2a and arranged and provided for impact upon the upper or smaller end of the mandrel 11.

The lower end of the shank section 2a is enlarged to provide a head 14 freely movable within the enlarged portion 15 of the bore of the mandrel, said enlarged portion 15 resulting in an internal shoulder 16 within the mandrel 11 for contact with the head 14 to limit the relative outward movement of the shank section 2a and mandrel 11.

Threaded or otherwise coupled to the outer end portion of the mandrel 11 is a desired tool 17, herein disclosed as constituting a guide reamer provided with cutting teeth 18. It is to be understood, however, that any other suitable tool, may be employed.

The shank section 2a between the head 14 thereof and the shoulder 12 together with the wall of the smaller bore of the mandrel 11 are provided with interfitting splines 19 which freely permit relative movement of the shank section 2a and the mandrel 11 in a direction lengthwise of the shank section 2a, but connect such parts together for unitary rotation which is of advantage when it is desired to rotate the reamer 17 to cut the spearway in the pipe P in the event the pipe is damaged at the entering point.

It is to be particularly noted that the inner end of the applied guide reamer 17 is of a diameter greater than that of the adjacent portion of the mandrel 11. This results in the provision of a shoulder 20 surrounding the mandrel 11, said shoulder 20 serving to stop the travel of the slip sleeve 7 by contact with the free extremities of the arms 9 in the event two or more pieces of pipe are pulled free and thus prevent undue expansion of the arms 9.

The upper or coupled end of the slip sleeve 7 is also of a diameter greater than the adjacent portion of the release sleeve 5 to provide a shoulder 21 surrounding the sleeve 5 for butting contact with an outer guard sleeve 22 surrounding the release sleeve 5 and which is tightened up against the external surrounding shoulder 23 carried by the upper portion of the sleeve 5 at a point immediately adjacent to the applied collar 6.

The lower portion of each of the pulling slots 4 is transversely enlarged, as at 24, to one side thereof to provide an upper shoulder 25, the lower edge wall of said enlarged portion 24 below the shoulder 25 being disposed, as at 26, on a downward incline to the lower end of the slot 4. The extremities of the key 3 are normally within the pulling slots 4 above the enlarged portions 24 thereof.

When it is desired to effect a release the shank 2 is permitted to drop until the shoulder 12 strikes the upper end of the mandrel 11 and at which time the head 14 of the shank section 2a will strike the guide reamer 17. The resultant jarring action or impact will result in the desired relative movement of the mandrel 11 with respect to the sleeve 7 in a direction to permit the outer or gripping end portions of the arms 9 to retract. After this impact or jar the continued downward movement of the shank 2 will permit the shoulder 27 afforded by the lower end of the stem 1 to have impact with the upper end of the sleeve 5 which, through the medium of the applied collar 6, is in contact with the adjacent end of the pipe P.

This second jar or impact will set up sufficient vibration in the pipe P to assure complete disengagement of the teeth 10 of the arms 9 from the pipe P. The shank 2 is then rotated in a direction to bring the extended portions of the key 3 below the shoulders 25 so that upon upward pull on the shank 2 the device may be readily removed from within the pipe P.

From this position of release all that is required to reset for another pull is to lower the shank 2 and the contact of the extended extremities of the key 3 with the inclined wall edges 26 will automatically shift the shank to the left and return said extended extremities of the key 3 within the pulling slots 4 so that as strain is imposed upon the shank 2, the mandrel 11 will be caused to operate to effect the desired expansion of the arms 9 to bring the teeth 10 thereof into proper gripping engagement with the pipe P. The main advantage of this resetting spear is in the event two or more pieces are pulled at the same time as the spear is always set for the pull.

The bottom or lower section 2a of the shank cannot be rotated when the mandrel 11 and slip sleeve 7 are tight, as when pulling, which will be a safety feature in preventing the key being placed in releasing position as a heavy pulling in this position will damage the key or the shoulders 25 when the slip sleeve and mandrel are set tight. It is, therefore, necessary to jar the mandrel 11 free before the spear can be set for releasing.

The jarring blow or impact delivered by the shoulder 12 and the head 14 releases the mandrel 11 while the jar or impact delivered by the shoulder 27 upon the upper end of the release sleeve 5 and collar 6 will assure the positive release of the teeth 10 from the pipe P. This collar 6 is coupled to the sleeve 5 by left hand threads so that when the spear is rotating as is required in making up the drill stem, in going into the hole the collar 6 will always tighten instead of being liable to back off. The collar 6 also serves to advantage as a stop to allow the release sleeve 5 to enter the pipe only to the stop shoulder if fishing for a short piece. The collar 6, however, can be removed when desired to use the spear for pulling two or more pieces that have been cut in sections with a cutting tool. When removing the collar 6 to fish for pipe as just stated it will be necessary to uncouple the shank 2 from the stem 1 and apply a connection that will readily enter the pipe P.

The release sleeve 5 has associated therewith the outer guard sleeve 22 for the purpose of preventing displacement of the key 3 from effective position and also to keep rock and kindred foreign matter from lodging within the slots 4 and thus probably interfere with the desired operation of the key 3. This guard sleeve 22 also serves to strengthen or reinforce the release sleeve 5 and prevent it from spreading out.

It is to be noted that one of the jarring impacts or blows occurs within the mandrel 11. This is of advantage as it permits considerable shortening of the spear and reduces the weight thereof and also cheapens the cost of manufacture.

My improved spear, as herein disclosed, is also of advantage in that it can be released with the tool 17 setting in the bottom of the hole or on top of an obstruction within the hole as the shank 2 can always be lowered when in this second named position. When in this second named position, an impact will jar the mandrel 11 if only for a fractional distance but this will enable the shank 2 or shank section 2a to be rotated sufficiently to the right to place the extremities of the key 3 in release position as indicated in Figure 5. When it is desired to remove the release sleeve 5 all that is necessary to do is to back off the lower shank section 2a which can be readily accomplished by placing tongs on the lower end of mandrel 11 and guide reamer or other tool 17.

The spline fit of the mandrel 11 on the shank section 2a will assure the section 2a backing off of the upper or main shank 2 whereupon the slip sleeve 7 can be readily removed. The key 3 will hold the release sleeve 5 from turning when tongs are placed on the slip sleeve 7.

In the embodiment of the invention as illustrated in Figures 6 and 7, the collar 6' is solid with the sleeve 5' and at diametrically opposed points or otherwise as desired the collar 6' is provided with notches or recesses 28 in the peripheral wall thereof to allow pump circulation when the collar 6' is resting upon the pipe or fish to be pulled. Similar notches may also be provided in a collar detachably engaged with the sleeve.

The solid collar 6' as illustrated in Figures 6 and 7 is also particularly intended to be used in connection with the spear for pulling one piece only. It is also to be understood that the threaded collar 6 is to be removed in case it is desired to pull more than one piece at a time and under which conditions the drill stem 1 must be of a diameter to readily enter the pipe P in order to permit the spear to go down sufficiently for the desired multiple pulling.

From the foregoing description it is thought to be obvious than an automatic resetting spear constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An automatic resetting spear comprising an elongated shank, a tapered mandrel carried by and surrounding the lower portion of the shank, a slip sleeve surrounding the shank and having its lower end portion provided with gripping arms, the tapered mandrel engaging said gripping arms from within, said slip sleeve having a slot disposed along the upper portion thereof, said slot having its lower portion transversely enlarged in one direction, the lower portion of the edge wall of the slot opposed to the enlarged portion being inclined toward the lower end of the slot, said inclined wall being entirely to one side of the slot, said shank having a part working in the slot of the sleeve.

2. An automatic resetting spear comprising an elongated shank, a tapered mandrel carried by and surrounding the lower portion of the shank, said mandrel and shank being movable one with respect to the other in a direction lengthwise of the shank, the lower end of the shank upon dropping of the shank imposing a jarring impact upon the mandrel, a slip sleeve surrounding the shank and having its lower end portion provided with gripping arms, the mandrel engaging said gripping arms from within, the slip sleeve having a slot disposed along the upper portion thereof, said slot having its lower portion transversely enlarged in one direction, the lower portion of the edge wall of the slot opposed to the enlarged portion being inclined toward the lower end of the slot, said inclined wall being entirely to one side of the slot, said shank having a part working in the slot of the sleeve.

3. An automatic resetting spear comprising an elongated shank, a tapered mandrel carried by and surrounding the lower portion of the shank, said mandrel and shank being movable one with respect to the other in a direction lengthwise of the shank, the lower end of the shank upon dropping of the shank imposing a jarring impact upon the mandrel, a slip sleeve surrounding the shank and having its lower end portion provided with gripping arms, the mandrel engaging said gripping arms from within, the slip sleeve having a slot disposed along the upper portion thereof, said slot having its lower portion transversely enlarged in one direction, the lower portion of the edge wall of the slot opposed to the enlarged portion being inclined toward the lower end of the slot, said inclined wall being entirely to one side of the slot, said shank having a part working in the slot of the sleeve, said shank being provided with a shoulder for jarring contact with the upper end of the mandrel upon dropping of the shank.

4. An automatic resetting spear comprising an elongated shank, a tapered mandrel carried by and surrounding the lower portion of the shank, a slip sleeve surrounding the shank and having its lower end portion provided with gripping arms, the tapered mandrel engaging said gripping arms from within, the slip sleeve having a slot disposed along the upper portion thereof, said slot having its lower portion transversely enlarged in one direction, the lower portion of the edge wall of the slot opposed to the enlarged portion being inclined toward the lower end of the slot, said inclined wall being entirely to one side of the slot, said shank having a part working in the slot of the sleeve, and coacting means carried by the shank and the slip sleeve for vibrating the pipe in which the spear is inserted after jarring of the mandrel.

5. An automatic resetting spear comprising an elongated shank, a tapered mandrel carried by and surrounding the lower portion of the shank, a slip sleeve surrounding the shank and having its lower end portion provided with gripping arms, the tapered mandrel engaging said gripping arms from within, the slip sleeve having a slot disposed along the upper portion thereof, said slot having its lower portion transversely enlarged in one direction, the lower portion of the edge wall of the slot opposed to the enlarged portion being inclined toward the lower end of the slot, said inclined wall being entirely to one side of the slot, said shank having a part working in the slot of the sleeve, and a guard sleeve carried by the slip sleeve and housing the portion thereof provided with the slot.

6. An automatic resetting spear comprising an elongated shank, a tapered mandrel carried by and surrounding the lower portion of the shank, a slip sleeve surrounding the shank and having its lower end portion provided with gripping arms, the tapered mandrel engaging said gripping arms from within, the slip sleeve having a slot disposed along the upper portion thereof, said slot having its lower portion transversely enlarged in one direction, the lower portion of the edge wall of the slot opposed to the enlarged portion being inclined toward the lower end of the slot, said inclined wall being entirely to one side of the slot, said shank having a part working in the slot of the sleeve, and a collar carried by the upper portion of the slip sleeve for engagement with the adjacent end of the pipe into which the spear is inserted.

7. An automatic resetting spear comprising an elongated shank, a tapered mandrel carried by and surrounding the lower portion of the shank, a slip sleeve surrounding the shank and having its lower end portion provided with gripping arms, the tapered mandrel engaging said gripping arms from within, the slip sleeve having a slot disposed along the upper portion thereof, said slot having its lower portion transversely enlarged in one direction, the lower portion of the edge wall of the slot opposed to the enlarged portion being inclined toward the lower end of the slot, said inclined wall being entirely to one side of the slot, said shank having a part working in the slot of the sleeve, and a tool engaged with the lower portion of the mandrel and providing an outstanding shoulder surrounding the mandrel for coaction with the slip sleeve to limit the extent of movement of the mandrel and slip sleeve one toward the other.

8. An automatic resetting spear comprising an elongated shank, a tubular mandrel, said shank having a portion extending within the mandrel, the inner portion of the bore of the mandrel being enlarged, the extremity of the shank within the mandrel carrying a head, the portion of the shank extending within the mandrel and the outer portion of the wall of the bore of the mandrel interlocking to permit the shank and mandrel to rotate in unison and allowing the mandrel and shank to have relative movement lengthwise of the shank, a slip sleeve surrounding the shank and having its lower end portion provided with gripping arms, the mandrel engaging said gripping arms from within.

In testimony whereof I hereunto affix my signature.

WILLIAM J. MILLER.